United States Patent
Corcoran et al.

(10) Patent No.: US 8,695,094 B2
(45) Date of Patent: Apr. 8, 2014

(54) DETECTING SECONDARY INFECTIONS IN VIRUS SCANNING

(75) Inventors: Sean D. Corcoran, Rochester, MN (US); Michael T. Kalmbach, Elgin, MN (US); Jared W. Patterson, Rochester, MN (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1333 days.

(21) Appl. No.: 12/144,704

(22) Filed: Jun. 24, 2008

(65) Prior Publication Data

US 2009/0320134 A1 Dec. 24, 2009

(51) Int. Cl.
*G06F 21/00* (2013.01)

(52) U.S. Cl.
USPC .......................................................... 726/24

(58) Field of Classification Search
USPC ............................................................ 726/5
See application file for complete search history.

(56) References Cited

U.S. PATENT DOCUMENTS

| | | | |
|---|---|---|---|
| 5,738,985 A | 4/1998 | Miles et al. | |
| 2005/0120238 A1* | 6/2005 | Choi | 713/200 |
| 2006/0101263 A1* | 5/2006 | Costea et al. | 713/164 |
| 2006/0218637 A1 | 9/2006 | Thomas et al. | |
| 2007/0147371 A1* | 6/2007 | Radha et al. | 370/390 |
| 2008/0196104 A1* | 8/2008 | Tuvell et al. | 726/24 |
| 2011/0047618 A1* | 2/2011 | Evans et al. | 726/23 |

OTHER PUBLICATIONS

Keizer, Gregg; "Symantec Awarded Patent for Anti-Virus Scanning Technique", Mar. 2, 2005 URL: http://www.techweb.com/wire/60404800.
From Wikipedia, "Antivirus Software", pp. 1-6 URL: http://en.wikipedia.org/wiki/Anti-virus_software.
From Widipedia, "Social Network Service", pp. 1-6 URL: http://en.wikipedia.org/wiki/Social_networking.
MAC OS X 10.4 Help, "Organizing related files with Smart Folders", pp. 1-2 URL: http://docks.info.apple.com/article.html?path=Mac/10.4/en/mh2152.html.

* cited by examiner

*Primary Examiner* — William Goodchild

(74) *Attorney, Agent, or Firm* — Rabin & Berdo, P.C.

(57) ABSTRACT

A method, computer program product or computer system for scanning files in a computer system to detect additional infected files of a computer virus when a first infected file of the computer virus is identified, includes maintaining a friends tree for each file in the computer system, maintaining a search tree using the friends trees for scanning the files, searching the files listed in the search tree for the additional infected files, and quarantining the additional infected files detected in the searching.

24 Claims, 5 Drawing Sheets

DETECTING SECONDARY INFECTIONS IN VIRUS SCANNING

BACKGROUND

1. Technical Field

The present invention relates to virus scanning. More specifically, it relates to scanning files in a computer system to detect additional infections of a computer virus when a first infected file is identified.

2. Background Information

Antivirus software is a class of programs that search a computer system for any known or potential malicious software. They are computer programs that attempt to identify, neutralize or eliminate malicious software, which include not only computer viruses, but other threats to a computer system, such as worms, phishing attacks, rootkits, trojan horses or other malware. In this application, the term "computer viruses" is used as an example to describe all malicious programs that antivirus software is designed to handle in this application.

With the fast growth of home or office networks and the wide expansion of the Internet, antivirus software has become a much needed application on computers today, because the increase in connectivity makes it easier for viruses to spread. Antivirus software typically has two different working modes. It either has a virus dictionary and examines (i.e. scans) files in a computer system to look for known viruses matching definitions in the virus dictionary, or performs heuristic analysis by identifying suspicious behavior from any computer program which might indicate infection. The heuristic analysis includes data capture, port monitoring and other methods. Most commercial antivirus software uses both of these approaches, with an emphasis on the virus dictionary approach.

Often a computer virus infects more than one file in a computer system. Antivirus software has various methods for finding files in a computer system that are infected, from finding the first instance of an infection to finding additional infections once the first instance is found. However, most antivirus software relies on comparing the signature of a file against the signature of a known computer virus when scanning the entire computer system. This method is usually inefficient for finding additional infections.

At the time of this application, antivirus software makers have tried to improve the brute force searching method typically used in finding infections. Many of the attempts to improve antivirus detection have centered on looking for suspicious file behavior. This approach often requires a user to manually confirm or deny whether a file behavior relates to a virus. However, this approach tends to have many false positives, and it is easy for a user to become desensitized when there are too many false warnings. Moreover, even if this approach works well for finding the first instance of an infection, it cannot be applied to effectively search for additional infections, because this approach is fully dependent on file behavior, which is not suited for finding static files that may already be infected. Another approach that antivirus software developers have tried to improve the typical brute force method is to only search among those files that have had an update or create operation done on them. This approach works well for first instance infections, but may require a much broader search than necessary for additional infections due to unrelated and non-infected files that are also created and modified.

SUMMARY

A method, computer program product or computer system for scanning files in a computer system to detect additional infected files of a computer virus when a first infected file of the computer virus is identified, includes maintaining a friends tree for each file in the computer system, maintaining a search tree using the friends trees for scanning the files, searching the files listed in the search tree for the additional infected files, and quarantining the additional infected files detected in the search.

DETAILED DESCRIPTION

Figure 1:
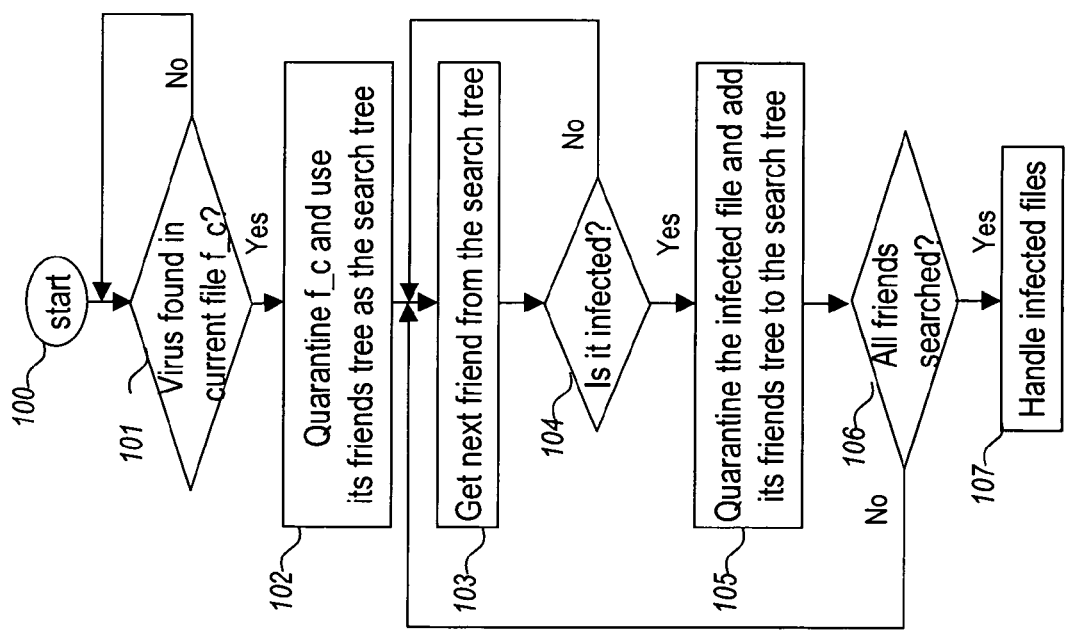
FIG. 1 is a flowchart illustrating the process of scanning a computer system for infected files.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention enables a method to quickly seek out files that are most likely infected by a computer virus. The present invention defines a friend of a file a to be another file b that this file a interacts with. A friends tree of the file a can be formed by including all friends of the file a, as well as all friends of its friends. The concept of friends is used to mitigate the risks of a virus spreading once a first instance of an infection is discovered.

The present invention thus enables a method to intelligently accelerate the detection, isolation, and inoculation/quarantine of a virus outbreak. In the present invention, friends are the files that have been or are commonly used together. For instance, a particular instance of a Word document would be a friend to the Microsoft Word application. Any file that the file a uses or interacts with would be considered a friend of the file a. Once a file is determined to have a virus, the list of friends of that file could be examined to identify the spread of the virus, and the infected files will be cleaned or quarantined. Hence, the spread of a virus can be stopped much more quickly and efficiently after the initial infection is detected. There is no need to search the entire file system each time when a infected file is found, or to search through all files that are created or modified since the last system scan. Only those files that have interacted with the infected file(s) are pertinent in determining the scope of the virus outbreak. Narrowing the scope of the file search can both identify infections faster, but also more quickly and efficiently divert system resources to prevent the virus from spreading.

A preferred embodiment of the present invention is described with reference to FIG. 1-FIG. 8.

In this embodiment of the present invention, a list of friends is maintained for each file or computer resource, such as I/O ports, on a given computer system. This list is maintained dynamically, and friends are added as a new file is created or the current file interacts with files it has never interacted with before. In an alternate embodiment of the present invention, the list can be expanded to include files located on a network.

FIG. 1 is a flowchart illustrating the process of scanning a computer system for infected files. In one embodiment of the present invention, the process starts at state 100, and it actively monitors for a virus in state 101. When a file f_c is identified as being infected with a virus by the antivirus software using a certain virus detection method, e.g. a method as described in the background section, in state 101, the antivirus software would choose the friends tree of file f_c as the search tree to determine what files to search next in state 102, thus speeding up the determination of the extent of the outbreak. Each of the friends off f_c will be searched in state 103, and if a file is infected (state 104), the infected file will be quarantined, and its friends tree will be added to the search tree for further search (state 105). This would continue until all friends are discovered to be free of viruses (state 106). Since the infected files have been quarantined during the process, the antivirus software can proceed to post-process the infected files in state 107, which may include the isolation, inoculation and deletion of these files, or other operations to remove the virus. In an alternate embodiment of the present invention, user customization can be added when forming the search tree to allow for specified subdirectories to be ignored in the search process.

The friends tree can be maintained by either an operating system or an antivirus software. Friends of a file are added as a new file is created or the current file interacts with files it has never interacted with before. To cut down on the resources required to maintain a friends tree for each file, the tree can be pruned when files are deleted from the system, or when a full system scan has been completed and all files are found to be virus free. In an intermediate node is pruned from a tree, e.g. from a file deletion, the sub-trees will be reconnected to form a new tree, instead of being lost from the old friends tree.

Figure 2:
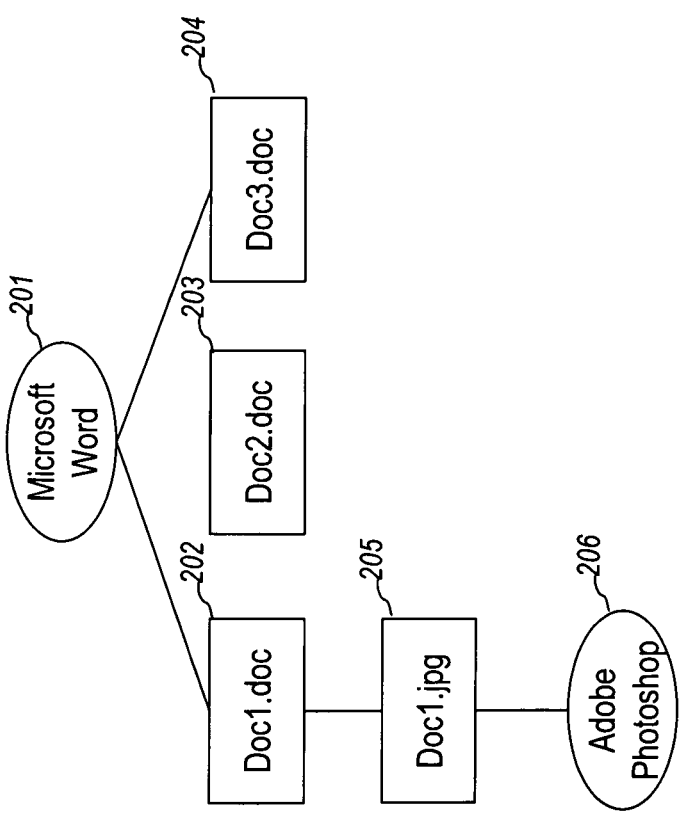
FIG. 2 illustrates an example of a friends tree.

FIG. 2 illustrates an exemplar friends tree. In this example, three Microsoft Word documents (namely, Doc1.doc 202, Doc2.doc 203 and Doc3.doc 204), have interacted with the Microsoft Word application 201. The document Doc1.doc 202 includes a JPEG image file named Doc1.jpg 205, which has been created by the Adobe Photoshop application 206.

Figure 3:
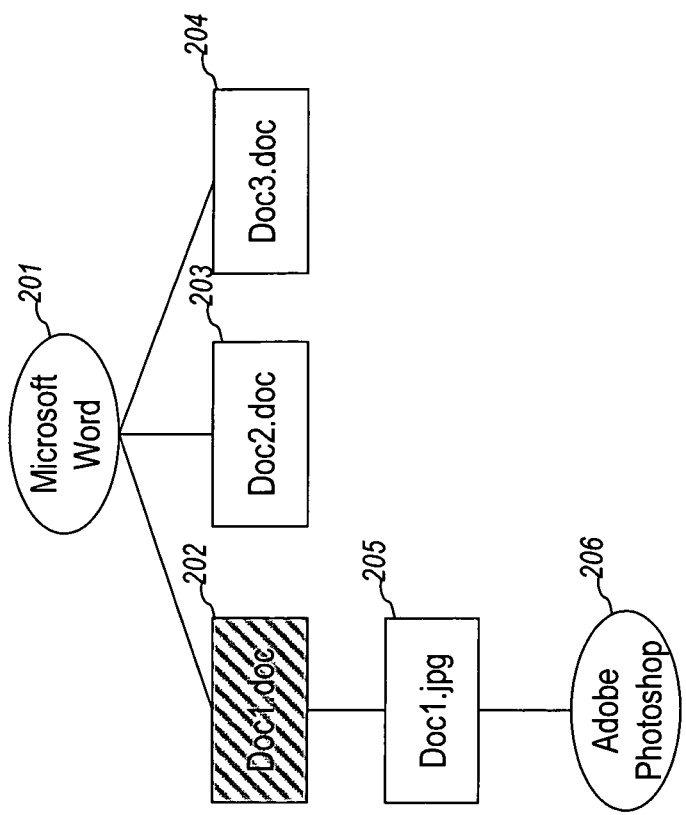
FIG. 3 illustrates a scenario where a file has been infected but the virus has not started to spread in the example shown in FIG. 2.
Figure 4:
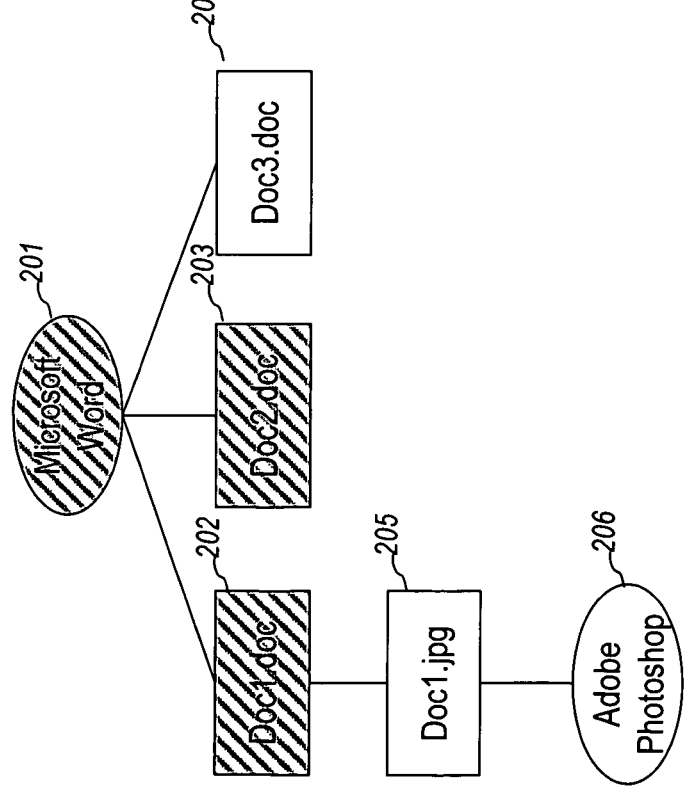
FIG. 4 illustrates a scenario where a file has been infected and the virus has started to spread in the example shown in FIG. 2.

FIG. 3 and FIG. 4 show how one embodiment of the present invention can search for the infected files in a file system as shown in FIG. 2. An infected file/application is shown as a file/application with shades in FIG. 3-FIG. 7.

FIG. 3 illustrates a scenario where a virus has not started to spread. In FIG. 3, only a single file, Doc1.doc 202, has been infected with a virus. Doc1.doc 202 has not been accessed and the virus has not had the opportunity to spread yet. In this scenario, one embodiment of the present invention will search its friends (i.e. Microsoft Word 201 and Doc1.jpg 205) and then stop, because no infections are found in either of its friends.

FIG. 4 illustrates a scenario where the virus has started to spread. In FIG. 4, Doc1.doc 202 was infected with the virus and had been accessed by the Microsoft Word application 201. So, the virus infected Microsoft Word 201. A user later accessed Doc2.doc 203 and in turn Doc2.doc 203 was infected. Doc3.doc 204, which had been opened in the past by Microsoft Word 201, but had not been accessed since the infection was introduced to the system, would remain uninfected. One embodiment of the present invention will search the friends of Doc1.doc 202 (i.e. Microsoft Word 201 and Doc1.jpg 205). Since Microsoft Word 201 is infected in this scenario, its friends (i.e. Doc2.doc 203 and Doc3.doc 204), will be added to the search tree and searched as well for infection.

Figure 5:
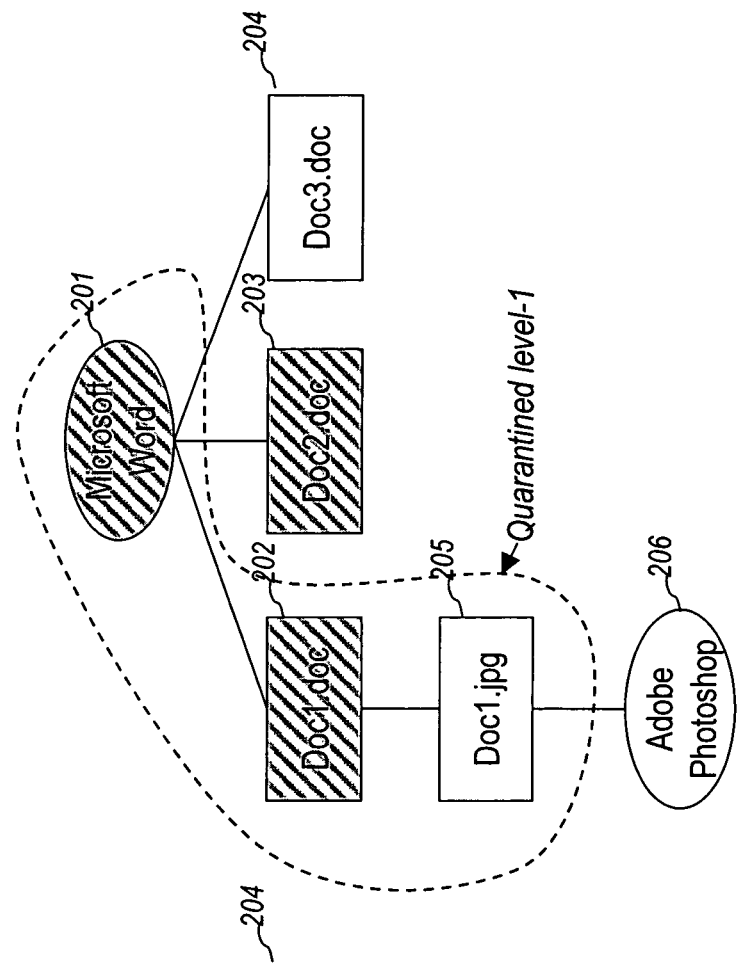
FIG. 5 shows the level-1 quarantine of infected files in the example illustrated in FIG. 4.
Figure 7:
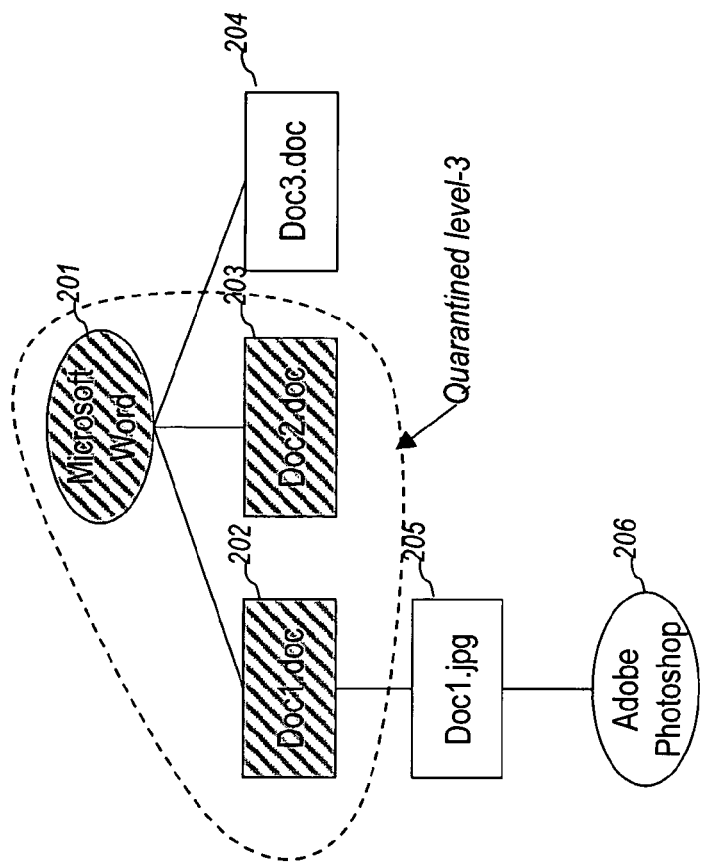
FIG. 7 shows the level-3 quarantine of infected files in the example illustrated in FIG. 4.
Figure 6:
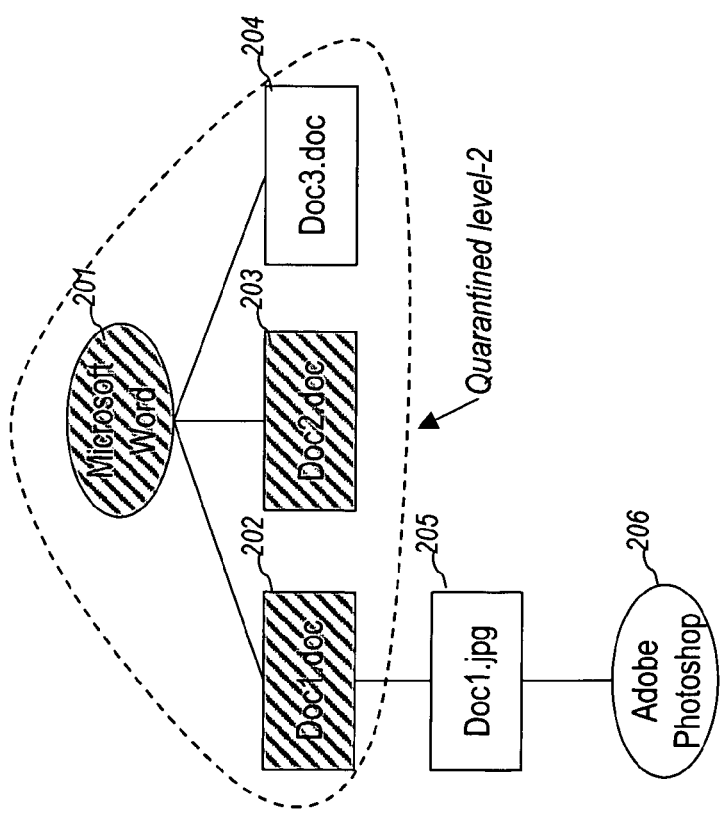
FIG. 6 shows the level-2 quarantine of infected files in the example illustrated in FIG. 4.

In one embodiment of the present invention, the infected files are quarantined in different levels, where each level corresponds to a certain depth of the search tree. FIG. 5-FIG. 7 show how the infected files are quarantined in different levels. FIG. 5 illustrates the first level of quarantine, in which friends of the infected file are automatically quarantined since they may also have been infected. FIG. 6 shows the second level of quarantine, in which the friends of Doc1.doc 202 have been searched and only the Microsoft Word application 201 has been found to be infected. The first level quarantine is now modified to include friends of the infected Microsoft Word program 201, and to remove the Doc1.jpg file 205 from quarantine since it was found to be not infected. In FIG. 7, the third level of quarantine is shown, where the friends of Microsoft Word 201 (i.e. DOC1.doc 202, Doc2.doc 203 and Doc3.doc 204) were searched and only Doc2.doc 203 was found to be infected. The quarantine is then modified to remove the clean Doc3.doc 204. No other files are included in the quarantine since all friends files have been searched. In an alternate embodiment of the present invention, the initial quarantine can be modified. For example, the initial quarantine can be expanded to include friends of friends of the infected file, so that the spread of the infection can be more quickly and safely stopped.

The present invention uses the friends tree to quickly identify the files that are most likely be infected with the virus that is found in the current file. However, there could be other files also infected that cannot be searched using the friends trees. In one embodiment of the present invention, these less likely infected files can be searched by a traditional virus search method.

The present invention can be implemented in a full system scan to ensure that an additional infected file is detected as soon as possible. Alternatively, the present invention can be implemented to scan a single file. If the file is found to be infected with a computer virus, the present invention can recommend scanning friends of this file prior to a full system scan. Traditional anti-virus software usually has both "full system scan" and "scan this file" functions. Therefore, the present invention can be incorporated into traditional anti-virus software to improve both functions.

Figure 8:
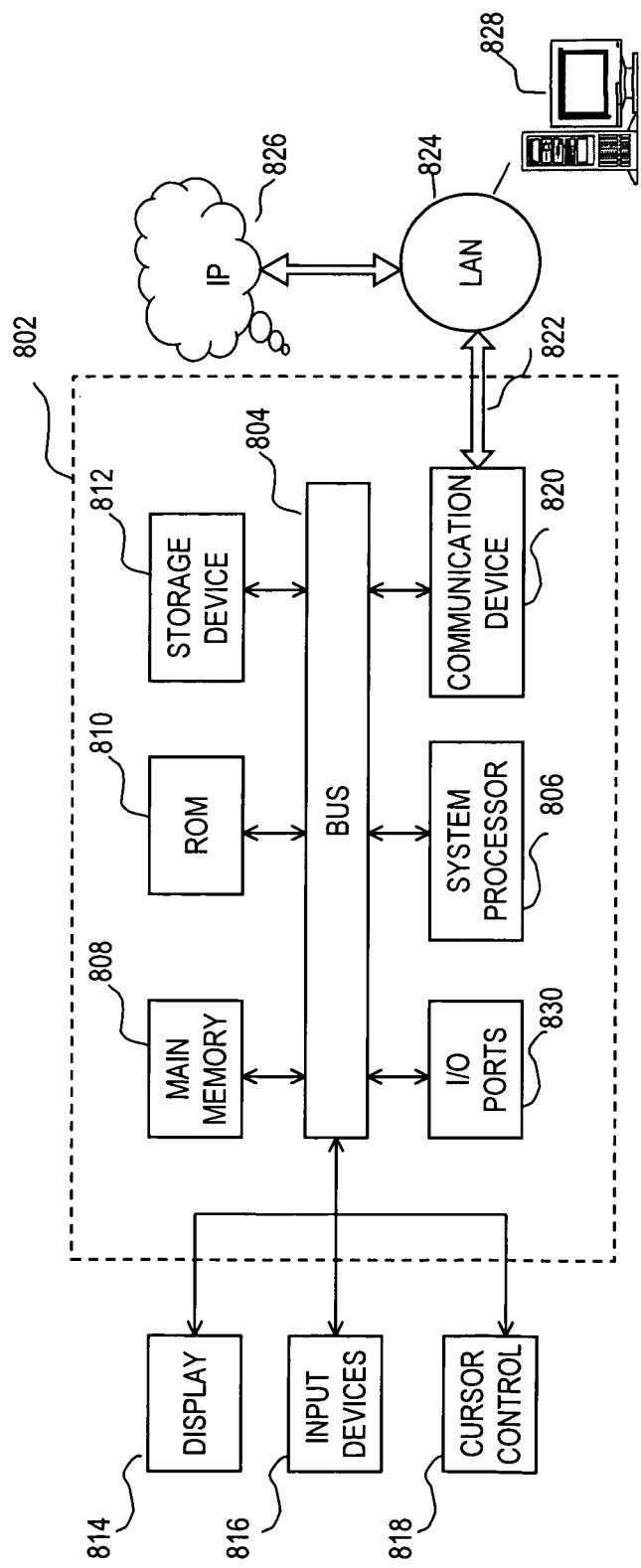
FIG. 8 is a conceptual diagram of a computer system in which the present invention can be utilized.

FIG. 8 illustrates a computer system (802) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (804) or other communication mechanism for communicating information and a processor (806) coupled with bus (804) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (806). In addition, main memory (808) may be used for storing temporary variables or other intermediate information during execution of instructions to be executed by processor. The computer system further includes a read only memory (ROM) 810 or other static storage device (e.g., programmable ROM (PROM), erasable PROM (EPROM), and electrically erasable PROM (EEPROM)) coupled to bus 804 for storing static information and instructions for processor. A storage device (812), such as a magnetic disk or optical disk, is provided and coupled to bus for storing information and instructions. This storage device is an example of a computer readable medium.

The computer system also includes input/output ports (830) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (814), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (816) and a cursor control (818), for communicating information and command selections to processor (806). Such command selections can be implemented via voice recognition hardware and/or software functioning as the input devices (816). The cursor control (818), for example, is a mouse, a trackball, cursor direction keys, touch screen display, optical character recognition hardware and/or software, etc., for communicating direction information and command selections to processor (806) and for controlling cursor movement on the display (814). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (820) provides a two-way data communication coupling to a network link (822) that may be connected to, for example, a local network (824). For example, the communication interface (820) may be a network interface card to attach to any packet switched local area network (LAN). As another example, the communication interface (820) may be an asymmetrical digital subscriber line (ADSL) card, an integrated services digital network (ISDN) card or a modem to provide a data communication connection to a corresponding type of telephone line. Wireless links may also be implemented via the communication interface (820). In any such implementation, the communication interface (820) sends and receives electrical, electromagnetic or optical signals that carry digital data streams representing various types of information.

Network link (822) typically provides data communication through one or more networks to other data devices. For example, the network link may provide a connection to a computer (826) through local network (824) (e.g., a LAN) or through equipment operated by a service provider, which provides communication services through a communications network (828). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for scanning files in a computer system for detecting files infected with a computer virus, comprising:
    maintaining a friends tree for each file in the computer system, the friends tree including at least one other file that is interactable with the file;
    seeking a first infected file infected with the computer virus;
    maintaining a search tree for the first infected file upon detection of the first infected file, the search tree including the friends tree of the first infected file;
    searching files listed in the search tree for a second infected file, when the first infected file is detected; and
    quarantining the second infected file, when the second infected file is detected in the searching.

2. The method of claim 1, wherein the maintaining a friends tree comprises:
    creating a friends tree for a new file when the new file is created;
    adding a first file to the friends tree of a second file, if the second file interacts with the first file that the second file has never interacted with before;
    pruning the friends tree of a file to remove select files, if the selected files are deleted from the computer system;
    pruning the friends tree of a file to remove selected files, when a full system scan has been completed and the selected files are found to be virus free; and
    reconnecting sub-trees to form a new friends tree, if an intermediate node is pruned from a friends tree.

3. The method of claim 1, wherein the friends tree is maintained by one of an operating system and an antivirus software.

4. The method of claim 1, wherein the maintaining a search tree comprises:
    using the friends tree of the first infected file as the search tree; and
    adding a friends tree of a friend of an infected file to the search tree, if the friend is infected with the computer virus.

5. The method of claim 1, wherein the computer system comprises a plurality of computers connected by a computer network.

6. The method of claim 1, wherein the quarantining comprises quarantining the infected files in different levels, each level corresponding to a depth of the search tree.

7. The method of claim 1, further comprises a post-processing step to deal with the detected infected files.

8. The method of claim 1, wherein the search tree includes more than one node.

9. A computer program product for scanning files in a computer system for detecting files infected with a computer virus, the computer program product comprising:
   a non-transitory computer usable medium having computer usable program code embodied therewith, the computer usable program code comprising:
   instructions to maintain a friends tree for each file in the computer system, the friends tree including at least one other file that is interactable with the file;
   instructions to seek a first infected file infected with the computer virus;
   instructions to maintain a search tree for the first infected file using the friends trees, when upon detection of the first infected file is detected, the search tree including the friends tree of the first infected file;
   instructions to search files listed in the search tree for a second infected file, when the first infected file is detected; and
   instructions to quarantine the second infected file, when the second infected file is detected in the searching.

10. The computer program product of claim 9, wherein the instructions to maintain a friends tree comprises:
   instructions to create a friends tree for a new file when the new file is created;
   instructions to add a first file to the friends tree of a second file, if the second file interacts with the first file that the second file has never interacted with before;
   instructions to prune the friends tree of a file to remove select files, if the selected files are deleted from the computer system;
   instructions to prune the friends tree of a file to remove selected files, when a full system scan has been completed and the selected files are found to be virus free; and
   instructions to reconnect sub-trees to form a new friends tree, if an intermediate node is pruned from a friends tree.

11. The computer program product of claim 9, wherein the friends tree is maintained by one of an operating system and an antivirus software.

12. The computer program product of claim 9, wherein the instructions to maintain a search tree comprises:
   instructions to use the friends tree of the first infected file as the search tree; and
   instructions to add a friends tree of a friend of an infected file to the search tree, if the friend is infected with the computer virus.

13. The computer program product of claim 9, wherein the computer system comprises a plurality of computers connected by a computer network.

14. The computer program product of claim 9, wherein the instructions to quarantine comprises instructions to quarantine the infected files in different levels, each level corresponding to a depth of the search tree.

15. The computer program product of claim 9, further comprises instructions to deal with the detected infected files in a post-processing step.

16. The computer program product of claim 9, wherein the search tree includes more than one node.

17. A computer system comprising:
   a processor;
   a memory operatively coupled with the processor;
   a storage device operatively coupled with the processor and the memory; and
   a computer program product for scanning files in a computer system for detecting files infected with a computer virus, the computer program product comprising:
   a non-transitory computer usable medium having computer usable program code embodied therewith, the computer usable program code comprising:
   instructions to maintain a friends tree for each file in the computer system, the friends tree including at least one other file that is interactable with the file;
   instructions to seek a first infected file infected with the computer virus;
   instructions to maintain a search tree for the first infected file using the friends trees, when upon detection of the first infected file is detected, the search tree including the friends tree of the first infected file;
   instructions to search files listed in the search tree for a second infected file, when the first infected file is detected; and
   instructions to quarantine the second infected file, when the second infected file is detected in the searching.

18. The computer system of claim 17, wherein the instructions to maintain a friends tree comprises:
   instructions to create a friends tree for a new file when the new file is created;
   instructions to add a first file to the friends tree of a second file, if the second file interacts with the first file that the second file has never interacted with before;
   instructions to prune the friends tree of a file to remove select files, if the selected files are deleted from the computer system;
   instructions to prune the friends tree of a file to remove selected files, when a full system scan has been completed and the selected files are found to be virus free; and
   instructions to reconnect sub-trees to form a new friends tree, if an intermediate node is pruned from a friends tree.

19. The computer system of claim 17, wherein the friends tree is maintained by one of an operating system and an antivirus software.

20. The computer system of claim 17, wherein the instructions to maintain a search tree comprises:
   instructions to use the friends tree of the first infected file as the search tree; and
   instructions to add a friends tree of a friend of an infected file to the search tree, if the friend is infected with the computer virus.

21. The computer system of claim 17, wherein the computer system comprises a plurality of computers connected by a computer network.

22. The computer system of claim 17, wherein the instructions to quarantine comprises instructions to quarantine the infected files in different levels, each level corresponding to a depth of the search tree.

23. The computer system of claim 17, further comprises instructions to deal with the detected infected files in a post-processing step.

24. The computer system of claim 17, wherein the search tree includes more than one node.

* * * * *